US010949621B2

(12) United States Patent
Omanwar et al.

(10) Patent No.: US 10,949,621 B2
(45) Date of Patent: Mar. 16, 2021

(54) IDENTIFYING INTRA SENTENCE VAGUE COMPONENTS

(71) Applicant: International Business Machines Corporation, Armonk, NY (US)

(72) Inventors: Anil Manohar Omanwar, Pune (IN); Anand Shantilal Borse, Carnegie (AU); Gandhi Sivakumar, Bentleigh (AU); Lalit Agarwalla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/367,315

(22) Filed: Mar. 28, 2019

(65) Prior Publication Data

US 2020/0311206 A1   Oct. 1, 2020

(51) Int. Cl.
*G06F 40/284* (2020.01)
*G06F 40/30* (2020.01)
*G06F 40/205* (2020.01)

(52) U.S. Cl.
CPC ............ *G06F 40/30* (2020.01); *G06F 40/205* (2020.01); *G06F 40/284* (2020.01)

(58) Field of Classification Search
CPC ....... G06F 40/30; G06F 40/284; G06F 40/205
See application file for complete search history.

(56) References Cited

U.S. PATENT DOCUMENTS

| 4,882,757 A * | 11/1989 | Fisher ................... G10L 15/193 704/253 |
| 7,302,383 B2 | 11/2007 | Valles |
| 8,380,489 B1 * | 2/2013 | Zhang ..................... G06F 40/30 704/4 |
| 10,387,469 B1 * | 8/2019 | Zhang ..................... G06F 16/35 |
| 2009/0037714 A1 | 2/2009 | DeWeerdt et al. |
| 2015/0188854 A1 | 7/2015 | Tomkins et al. |
| 2016/0048512 A1 * | 2/2016 | Cook .................... G06F 16/334 707/722 |

OTHER PUBLICATIONS

Lebanoff et al., "Automatic Detection of Vague Words and Sentences in Privacy Policies," Proceedings of the 2018 Conference on Empirical Methods in Natural Language Processing, Brussels Belgium, Oct. 31-Nov. 4, 2018, pp. 3508-3517, http://aclweb.org/anthology/D18-1387.

(Continued)

*Primary Examiner* — Abul K Azad
(74) *Attorney, Agent, or Firm* — Peter Edwards

(57) ABSTRACT

A method, system, and computer program product for identifying intra sentence vague components includes: receiving a first sentence, assigning tokens to each component of the first sentence, comparing a total number of tokens of the first sentence to a threshold number of tokens, in response to determining that the total number of tokens is less than the threshold number of tokens, identifying one or more relevant complete sentences from a database, determining a best sentence from the one or more relevant complete sentences, and determining a vague component of the first sentence by comparing the best sentence to the first sentence.

20 Claims, 5 Drawing Sheets

(56) References Cited

OTHER PUBLICATIONS

Haron et al., "A Method to Identify Potential Ambiguous Malay Words Through Ambiguity Attributes Mapping: An Exploratory Study," Computer Science and Information Technology, 2014, pp. 115-122, DOI: 10.5121/csit.2014.4210, https://airccj.org/CSCP/vol4/csit41910.pdf.
Thede, "Parsing and Tagging Sentences Containing Lexically Ambiguous and Unknown Tokens," A Thesis Submitted to the Faculty of Purdue University, Dec. 1999, 158 pages.
Van Rooij, "Vagueness and linguistics," Printed Jan. 28, 2019, 57 pages http://citeseerx.ist.psu.edu/viewdoc/download?doi=10.1.1.167.6583&rep=rep1&type=pdf.
Unknown, "The Stanford Parser: A statistical parser," The Stanford Natural Language Processing Group, Printed Jan. 28, 2019, 12 pages, https://nlp.stanford.edu/software/lex-parser.shtml.
De Marneffe et al., "Stanford typed dependencies manual," Revised for the Stanford Parser v. 3.7.0 in Sep. 2016, Sep. 2008, 28 pages.

* cited by examiner

IDENTIFYING INTRA SENTENCE VAGUE COMPONENTS

BACKGROUND

The present disclosure relates to natural language processing, and more specifically to identifying intra sentence vague components through neural parsing.

SUMMARY

The present invention provides a computer-implemented method, system, and computer program product for identifying intra sentence vague components. The method may include receiving a first sentence. The method may also include assigning tokens to each component of the first sentence. The method may also include comparing a total number of tokens of the first sentence to a threshold number of tokens. The method may also include, in response to determining that the total number of tokens is less than the threshold number of tokens, identifying one or more relevant complete sentences from a database. The method may also include determining a best sentence from the one or more relevant complete sentences. The method may also include determining a vague component of the first sentence by comparing the best sentence to the first sentence.

The system may have one or more computer processors and may be configured to receive a first sentence. The system may also be configured to assign tokens to each component of the first sentence. The system may also be configured to compare a total number of tokens of the first sentence to a threshold number of tokens. The system may also be configured to, in response to determining that the total number of tokens is less than the threshold number of tokens, identify one or more relevant complete sentences from a database. The system may also be configured to determine a best sentence from the one or more relevant complete sentences. The system may also be configured to determine a vague component of the first sentence by comparing the best sentence to the first sentence.

The computer program product may include a computer readable storage medium having program instructions embodied therewith, the program instructions executable by a server to cause the server to perform a method. The method may include receiving a first sentence. The method may also include assigning tokens to each component of the first sentence. The method may also include comparing a total number of tokens of the first sentence to a threshold number of tokens. The method may also include, in response to determining that the total number of tokens is less than the threshold number of tokens, identifying one or more relevant complete sentences from a database. The method may also include determining a best sentence from the one or more relevant complete sentences. The method may also include determining a vague component of the first sentence by comparing the best sentence to the first sentence.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
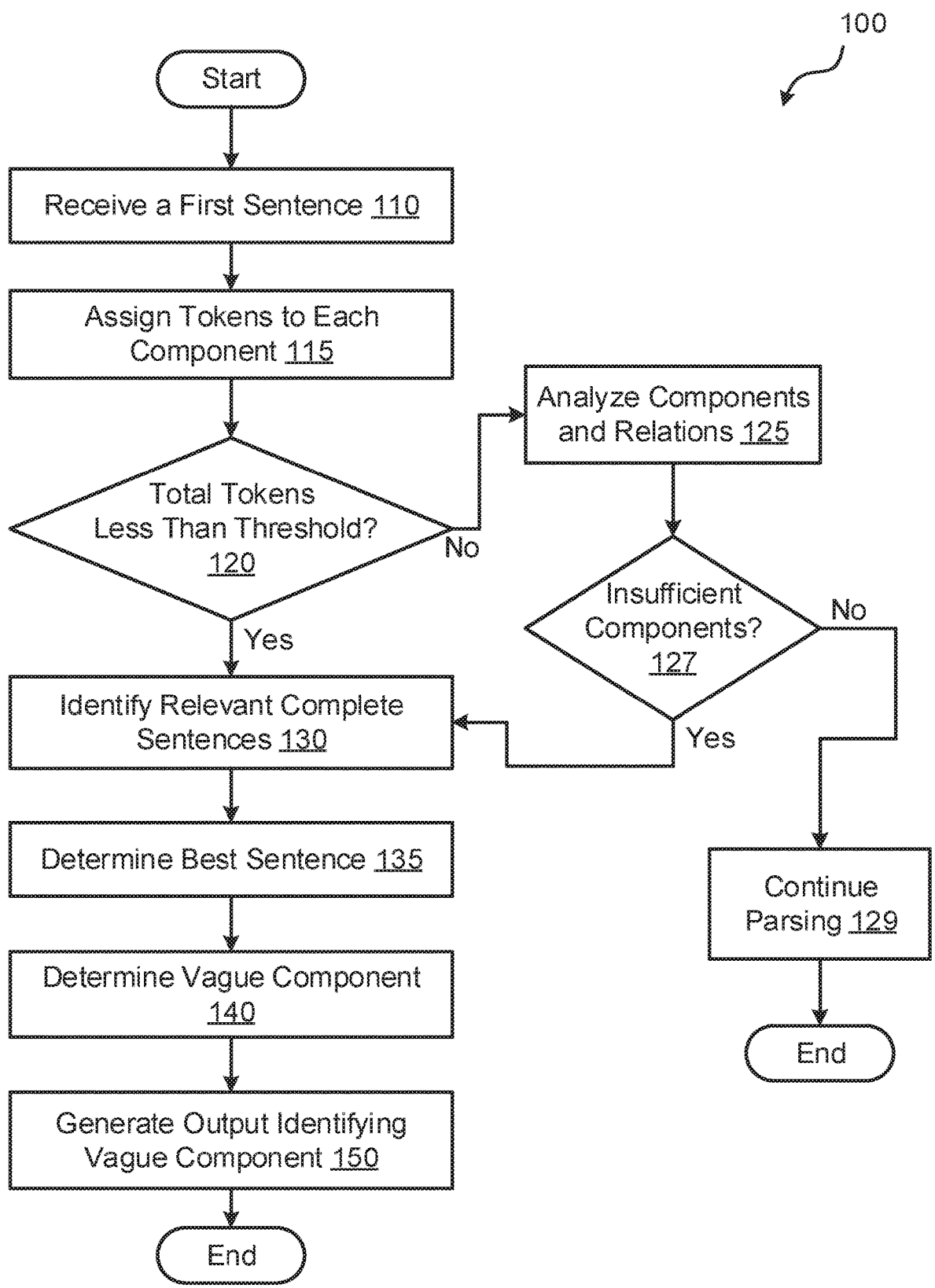
FIG. 1 depicts a flowchart of a set of operations for identifying intra sentence vague components, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to natural language processing, and more specifically to identifying intra sentence vague components through neural parsing. While the present disclosure is not necessarily limited to such applications, various aspects of the disclosure may be appreciated through a discussion of various examples using this context.

Natural language processing is used to identify components in natural language spoken or written text. Natural language processing may be used to take computer-readable text, split the text into portions, and then determine the various parts-of-speech for those portions. For simplicity, the text portions described herein are sentences, though other portions can be used as well (e.g., clauses or other phrases). In some instances, natural language processing, particularly shallow parsing, may not provide the same level of understanding, or comprehension, that a human analyzing the same sentence could achieve. This may lead to problems and incorrect analysis of the parsing, or processing. To help gain a more human-like understanding of sentences, natural language processing may use deep parsing. For example, for solutions requiring micro-processing of unstructured representations, neural parsers (i.e., parsers used in neural networks) may be used for identifying components. In a more specific example, to extract a subject and various components of a sentence, possibly to compare with other sentences, neural parsers are used.

Various problems may arise with neural parsers because neural parsers may lack the ability to define vague components within a sentence. Some neural parsers may leverage higher levels of abstraction (e.g., services which classify at sentence level or module level), which then require human intervention to analyze which part of the sentence is vague. With the continuous evolution of languages, along with shorthand and slang that is often used, neural parsing cannot always understand each component of a sentence. In some situations, a sentence may be missing a component or have an unclear component, and therefore may be incomplete. A sentence with a missing component or an unclear component may be referred to herein as a sentence that has a vague component.

The present disclosure provides a computer-implemented method, system, and computer program product for identifying intra sentence vague components. A sentence may be broken down into components and then tokenized, and those tokens may be compared with a threshold to determine whether the sentence is likely to be to have vague components, which may indicate that the sentence is incomplete. In addition, the sentence may be compared to other complete sentences (i.e., sentences with no vague components) in order to identify a sentence that is the most similar, or relates the most to, the current sentence. The identified sentence is referred to herein as a best sentence (i.e., a sentence that is most likely to help determine the vague components of the current sentence). The best sentence may be used to determine any vague components of the current sentence.

Identifying vague components of a sentence may improve neural parsing for the sentence because, by identifying the vague components, the computer can more accurately parse the sentence and avoid parsing the vague components. Parsing vague components may result in an incorrect interpretation of the components which may lead to an inaccurate parsing of the sentence. In some instances, the vague components that may have been parsed incorrectly are identified for possible further action. The computer may be able to take corrective action to remove the vague components in the sentence, such as by replacing a component, adding a component, removing a component, etc. Correcting the vague components may further improve neural parsing for the sentence because, instead of parsing the sentence incorrectly, the vague sentence is corrected, which allows neural parsing to correctly parse the sentence.

Referring now to FIG. 1, a flowchart illustrating a method 100 for identifying intra sentence vague components is depicted, according to some embodiments. In some embodiments, the method 100 is implemented as a computer script or computer program (e.g., computer executable code) to be executed by a server on or connected to a computer system (e.g., computer system 430 (FIG. 4) or computer system 500 (FIG. 5)). In some embodiments, the server is a computer device, such as computer system/server 502 (FIG. 5).

In some embodiments, a server is configured to execute operation 110 to receive a first sentence. In some embodiments, the first sentence is submitted, or inputted, by a user and is received by the server to perform natural language processing, or neural parsing. A sentence may be one or more words in sequence. Some example sentences include, "I don't like that" and "It happened in the morning at 10:00 AM."

In some embodiments, a server is configured to execute operation 115 to assign a token to each component of the first sentence. In some embodiments, the sentence is broken down into one or more components. In some embodiments, a component is a word of the sentence. Using one of the above example sentences, "I don't like that" may be broken down into four components, "I," "don't," "like," and "that." In this example, a token may be assigned to each component, "I," "don't," "like," and "that," which results in the sentence having four tokens. In some embodiments, components include compound words of a sentence. For example, a sentence "What time do we set up" may be broken down into five components, "what," "time," "do," "we," "set up," with "set up" being a compound word. In this example, a token may be assigned to each component, "what," "time," "do," "we," "set up," such that the sentence has five tokens.

In some embodiments, assigning a token to each component may include tagging each token with a part-of-speech. Parts-of-speech may be syntactic categories of words. For example, parts-of-speech may include nouns, pronouns, adjectives, determiners, verbs, adverbs, prepositions, conjunctions, interjections, etc. Continuing the above example, each token of the sentence "I don't like that" could be tagged with the corresponding part-of-speech: "I" tagged as a personal pronoun, "don't" tagged as a verb, "like" tagged as a verb, and "that" tagged as a pronoun. In some embodiments, the part-of-speech tagging may be done using a parse tree, which is described further in FIG. 3.

In some embodiments, method 100 further comprises calculating a threshold number of tokens for a complete sentence stored in a database (i.e., the database that is, or will be, storing the first sentence). The database may be storing a plurality of sentences and may use these stored sentences to determine a threshold number of tokens in order for the sentence to be complete. In some embodiments, complete sentences are sentences stored on the database with no identified vague components. In some embodiments, calculating the threshold number of tokens includes determining a number of tokens for each complete sentence in the database after removing any outlier number of tokens, and then calculating a mean number of tokens per sentence in the database. This mean number of tokens per sentence may then be used as a minimum number of tokens used to form a complete sentence. In some embodiments, other numbers may be used in place of a mean number of tokens per sentence, such as the number of tokens in the sentence with the fewest number of tokens, or the number of tokens in the sentence at the $10^{th}$ percentile of sentences in the database when ordered by the number of tokens.

In some embodiments, determining a number of tokens for each complete sentence in the database includes adding up the tokens for each complete sentence in the database and determining a total number of tokens for each sentence. In some embodiments, the database is assumed to include only complete sentences, though incomplete sentences can be included in other embodiments. In some embodiments, each complete sentence, or each incomplete sentence, may be tagged to indicate their completeness or incompleteness, respectfully.

In some embodiments, removing any outlier number of tokens includes determining an average number of tokens for the complete sentences, and identifying the outliers using the average (such as through standard deviation). For example, the average number of tokens is 5 tokens, with a standard deviation of 1.25 (e.g., 5±1.25). In this example, a complete sentence with 2 tokens is an outlier, because it is not within the variation range determined by the standard deviation (i.e., 3.75-6.25). This outlier sentence with 2 tokens may be removed from the calculation. In some embodiments, the median number of tokens is used to identify the outliers. Removing the outlier number of tokens may remove numbers of tokens that do not follow the trend of the other complete sentences. This may help increase the accuracy of the threshold number of tokens, which in turn may increase the accuracy of determining vague components of the sentence.

In some embodiments, once the outliers are identified and removed, the minimum number of tokens used to form a complete sentence is determined. The minimum number of tokens may be the lowest number of tokens in a complete sentence, after the outliers have been removed. The minimum number of tokens is the threshold number of tokens, in some embodiments. In some embodiments, the minimum number of tokens is indicative of the lowest number of tokens necessary, according to the other complete sentences stored on the database, to form a complete sentence. The minimum number of tokens, or threshold number of tokens, may help identify whether the first sentence is a complete sentence.

In some embodiments, a server is configured to execute operation 120 to determine if the total number of tokens in the first sentence assigned in operation 115 is less than a threshold number of tokens. The total number of tokens of the first sentence may be compared to the threshold number of tokens to determine the relationship between numbers of tokens. In some embodiments, determining whether the total number of tokens is less than the threshold number of tokens helps determine whether the first sentence is likely to be a complete sentence. If the total number of tokens is greater than or equal to the threshold number of tokens, it may be more likely that the first sentence is a complete sentence. If the total number of tokens is less than the threshold number of tokens, it may be more likely that the first sentence is not a complete sentence, and therefore may have one or more vague components.

In some embodiments, If the total number of tokens is less than the threshold number of tokens, the server may continue to operation 130 to identify relevant complete sentences. In some embodiments, relevant complete sentences are one or more complete sentences (i.e., sentences with no vague components) stored on the database that are determined to be relevant, or similar to, the first sentence. In some embodiments, sentences that are determined to have vague components are tagged, and sentences with no vague components may either have a different tag, or no tag at all. The tag, or lack of tag, signifying that a sentence does not have vague components may indicate that the sentence is a complete sentence. In some embodiments, sentences that are determined to have vague components are corrected (i.e., an action is taken to fix or remove the vague component) before the sentence, now a complete sentence, is stored in the database. This may result in only complete sentences being stored in the database.

In some embodiments, the relevant complete sentences are sentences with a similar number of tokens to the first sentence. For example, the relevant complete sentences may be sentences that have no more than three tokens more than the first sentence. In some embodiments, relevant complete sentences may not have a lower number of tokens than the first sentence. In some embodiments, the relevant complete sentences are sentences with one or more similar, or matching, tokens as the first sentence. For example, a sentence that has multiple tokens that match the first sentence may be a relevant complete sentence.

Figure 2:
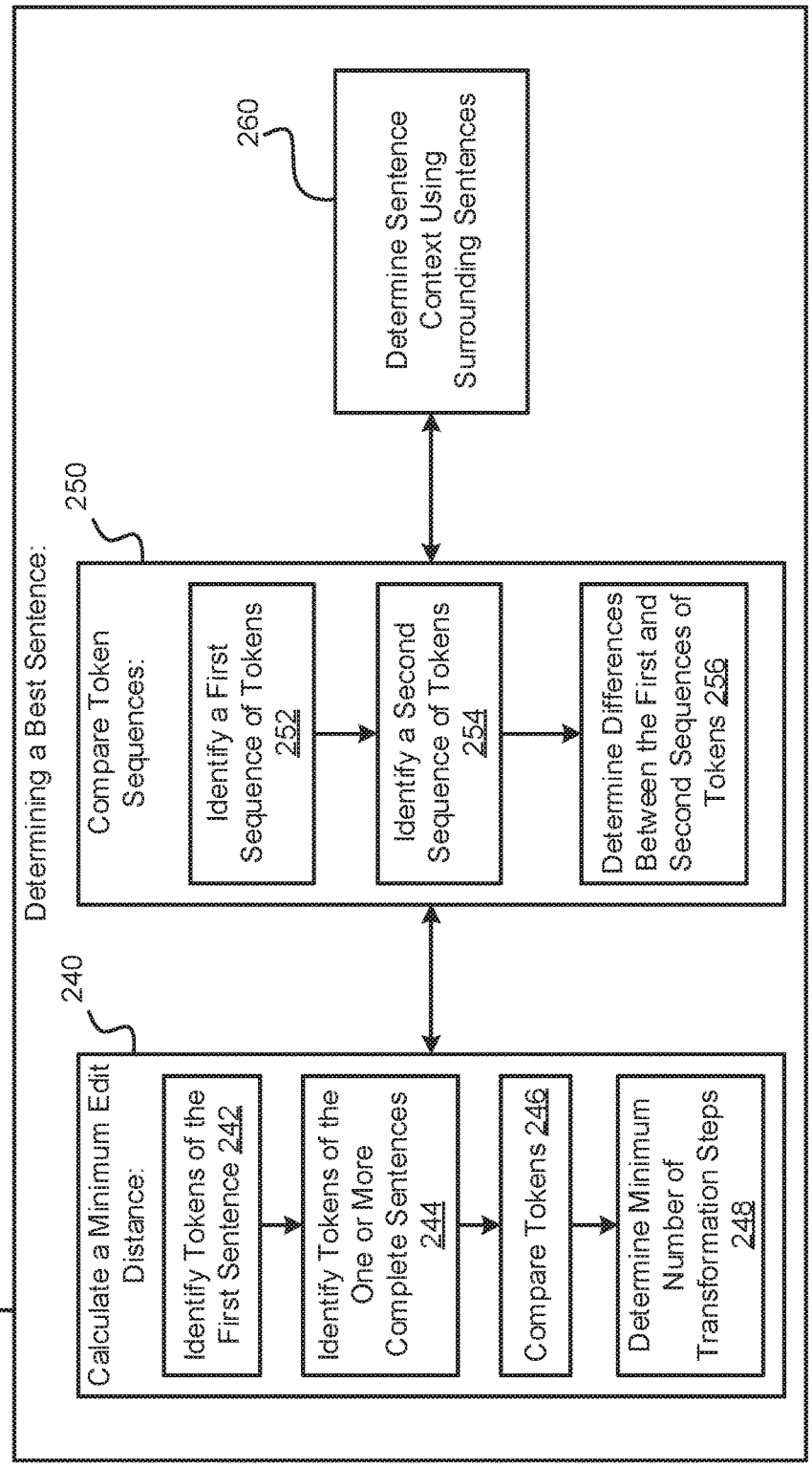
FIG. 2 depicts a schematic diagram of a set of operations for determining a best sentence, according to some embodiments.

In some embodiments, a server is configured to execute operation 135 to determine the best sentence. If there is at least one relevant complete sentence, the relevant complete sentences may be used to help identify the best sentence. In some embodiments, the best sentence is one of the relevant complete sentences that is determined to have the greatest similarity to the first sentence. The best complete sentence may be used to help identify vague components in the first sentence. Determining the best sentence is discussed further herein, and is depicted in FIG. 2.

In some embodiments, a server is configured to execute operation 140 to determine a vague component of the first sentence. Determining the vague component may include comparing the first sentence to the best sentence. In some embodiments, a vague component is a component that is either missing or unclear from the first sentence. For example, vague components may be new words, shorthand, missing words, and/or slang used in a sentence, that are not easily understood using natural language processing and neural parsing.

In some embodiments, determining the vague component of the first sentence includes determining one or more differences between the first sentence and the best sentence, and determining the vague component of the first sentence based on the one or more differences. Determining one or more differences between the sentences may include identifying any components, or tokens, that occur in the best sentence but that either do not exist in the first sentence or are different in the first sentence than in the best sentence. In some embodiments, determining the one or more differences between the first sentence and the best sentence includes comparing each token of the first sentence to a token of the best sentence with a corresponding part-of-speech, and determining that one or more tokens of the first sentence are different than one or more corresponding tokens (i.e., token with the corresponding part-of-speech) of the best sentence. A corresponding part-of-speech may be the same part-of-speech (e.g., a noun and a noun) or may be a related part-of-speech (e.g., a noun and a pronoun). In some embodiments, determining the one or more differences includes determining whether tokens with a different but related part-of-speech (i.e., still a corresponding part-of-speech) should be the same part-of-speech. This determination may be done using semantic and syntactic processing.

For example, a first sentence may be "I don't like that" and the best sentence may be "Milk tastes horrible." In this example, in the first sentence, "I" is a pronoun, "don't" and "like" are verbs, and "that" is a pronoun. In the best sentence, "milk" is a noun, "tastes" is a verb, and "horrible" is an adjective. Continuing the example, the verbs "don't" and "like" may be compared to "tastes" and the pronouns "I" and "that" may be compared to "milk" (because a pronoun is a related part-of-speech to noun). The other tokens with unrelated parts-of-speech to the first sentence (e.g., the adjective "horrible") may be determined as different than the first sentence. In this example, "I" is determined to be different and unrelated to "milk." "That" may also be determined to be different than "milk," but using semantic and syntactic analysis, it may be determined that "milk" and "that" may serve the same purpose in their respective sentences (i.e., to function as an identification of a person, place, or thing). In this example, it may be determined that "milk" and "that" should have the same part-of-speech, so, because "that" has a different part-of-speech than "milk" in the best sentence, "that" may be determined to be a vague component.

Different tokens may also include tokens with a part-of-speech that is missing from one of the sentences. For example, the first sentence may be "while going he met his old friend" and the best sentence may be "he met his friend while going to the mall yesterday." In this example, the first sentence is missing a token that identifies a noun representing the location (i.e., where he is "going") and the best sentence includes a token with a noun part-of-speech, "the mall," that identifies the location. In this example, the vague component may be determined to be "going," because it is unclear, or vague, where "he" is going. In some embodiments, the vague component, in this example, may be simply that there is a missing noun (e.g., location component).

In some embodiments, as discussed above, determining the vague component includes determining that there is a component that is different than the best sentence. In some embodiments, the component that is different is an unclear, or unidentifiable, component of the first sentence, and is therefore vague. Vague components may be hard to process through neural parsing because they are not easily understood by the neural parser, as discussed herein. In some embodiments, determining the vague component includes determining that there is a missing component in the first sentence when comparing the first sentence to the best sentence. The best sentence may include a part-of-speech, for instance, that is not included in the first sentence. The missing component may be the vague component in this instance.

Looking back to operation 120, if it is determined that a total number of tokens is not less than the threshold number of tokens, the server may proceed to operation 125 to analyze components and relations. As discussed above, if the total number of tokens of the first sentence is greater than or equal to the threshold number of tokens, it is less likely that the first sentence is incomplete, or that the first sentence has vague components. Even though it is less likely, there is still a possibility that the first sentence is incomplete. In some embodiments, to determine whether the first sentence is incomplete, the server analyzes the components and relations of the first sentence. In some embodiments, analyzing components and relations of the first sentence includes determining, or identifying, the part-of-speech of each component and then determining the relationship between the parts-of-speech. Determining the relationship between the parts-of-speech may include determining how many parts-of-speech there are in the first sentence. Further, the number of components that correspond to each different part-of-speech nay be determined. For example, a sentence may have at least nouns, verbs, and prepositions, but the first sentence may have three components that are prepositions but only one component that is a noun. The existence of multiple prepositions but only one noun may be an indication that there are vague components in the sentence.

Figure 3:
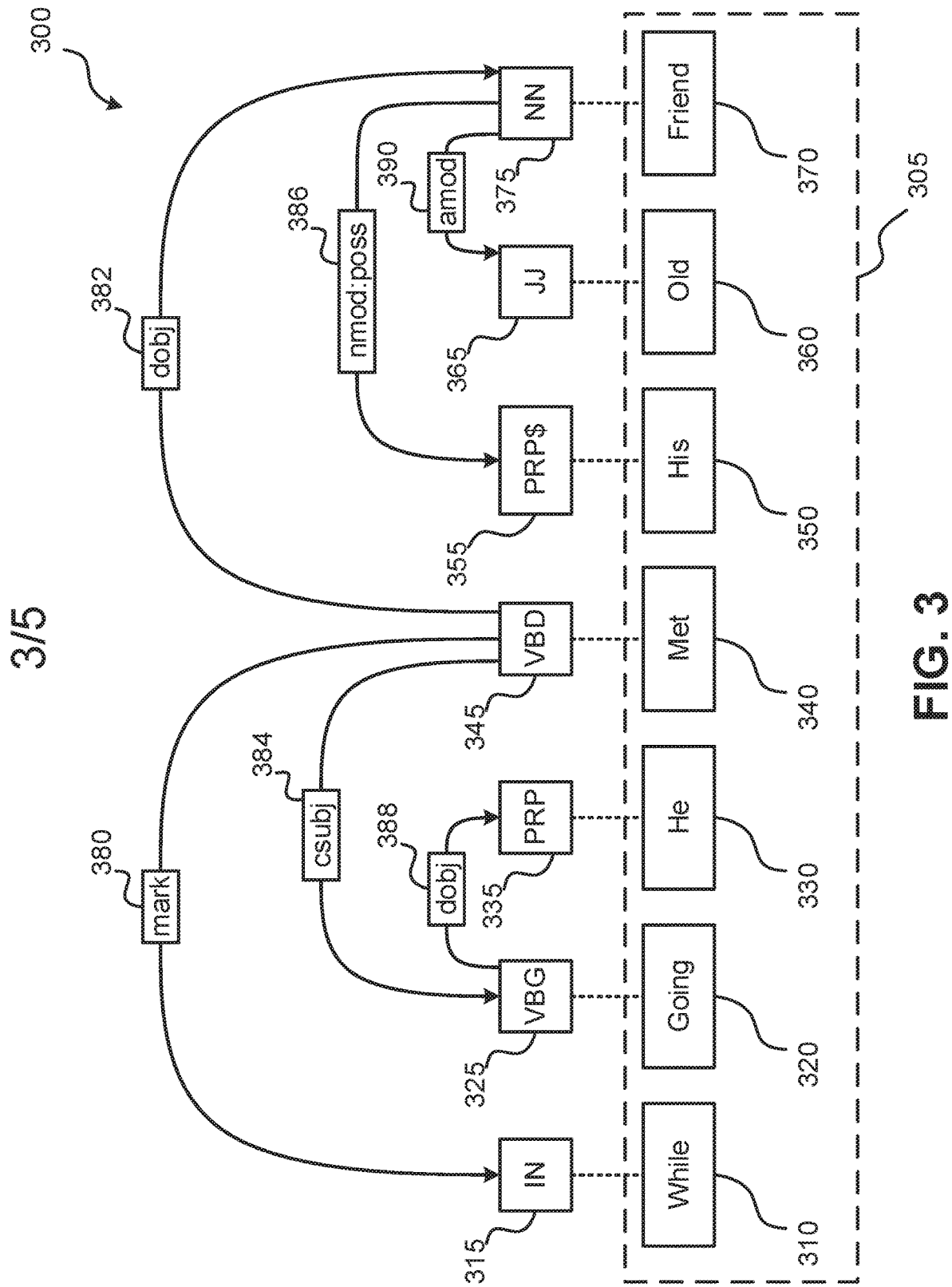
FIG. 3 depicts a schematic diagram of an example parse tree, according to some embodiments.

In some embodiments, a server is configured to execute operation 127 to determine if there are insufficient components. In some embodiments, insufficient components are identified by there being too little variance between components in a sentence. In some embodiments, too little variance is defined as a lack of variety in parts-of-speech included in a sentence. For example, a complete sentence usually has a noun and a verb. If a sentence does not include at least a noun and a verb, the sentence may have insufficient components. In some embodiments, determining whether there is too little variance between components includes analyzing the relationship between the parts-of-speech of the first sentence. Different parts-of-speech may have a direct relationship with other parts-of-speech. For instance, an adjective may describe a noun, an adverb may describe a verb, a pronoun may substitute for a noun, a preposition may combine with a noun, a conjunction may join two words or phrases, etc. Adjectives and prepositions may require a noun, or a pronoun, to be present in the sentence. If the sentence is lacking a noun, or if there are significantly more adjectives, prepositions, conjunctions, determiners, etc. than there are nouns/pronouns in a sentence, there may be insufficient components in the first sentence. The same, or similar, analysis may apply to other parts-of-speech that have a relationship, such as verbs and adverbs, etc. In some embodiments, determining insufficient components may involve using a parse tree, which is depicted in FIG. 3.

In some embodiments, if there are not insufficient components, the server proceeds to operation 129 and continues conventional neural parsing. If there are not insufficient components, it may be determined that the first sentence is a complete sentence and does not have vague components, therefore conventional neural parsing may be applicable.

In some embodiments, if there are insufficient components identified in operation 127, a server may proceed to operation 130 to identify the relevant complete sentences. Operation 130 is discussed further herein.

In some embodiments, method 100 further includes operation 150 to generate an output identifying the vague component of the first sentence. Once it is determined that the first sentence has a vague component, an output may be generated to indicate this determination. In some embodiments, the output may be an indication to a user that the first sentence has a vague component. For example, if the first sentence is "I don't like that" the output may be a natural language statement displayed to the user stating, "The inputted sentence includes a vague component." In some embodiments, the output identifies the specific component that is vague. Using the previous example, the output may state, "The component "that" is unclear."

In some embodiments, the output includes an instruction for adding a component to the first sentence. The adding may be done based on the vague component. Again using the previous example, the output may state that "It is recommended to replace "that" in the submitted sentence with a noun." This example output includes a suggestion on a part-of-speech to add to the sentence to make the sentence complete. This example also identifies which component is vague, which results in a suggested replacement of components to make the sentence more complete. In some embodiments, the output includes a specific component, or word, recommendation to add to the sentence, which is determined using the best sentence. Using the previous example, instead of just recommending replacing the sentence with a noun, the output may recommend replacing "that" with "milk." In some embodiments, as discussed above, the vague component is a missing component. When the vague component is a missing component, the output may be a recommendation to add the component.

In some embodiments, the output includes a programming instruction, or task, to fix the vague component. Fixing the vague component may include adding a component, replacing a component, removing a component, etc. This may allow the computer to automatically correct vague sentences and vague sentence components without user involvement, and neural parsing can proceed accurately and correctly.

Referring to FIG. 2, a schematic diagram illustrating a process 200 for determining a best sentence is depicted, according to some embodiments. In some embodiments, process 200 is implemented as a computer script or computer program (e.g., computer executable code) to be executed by a server on or connected to a computer system (e.g., computer system 430 (FIG. 4) or computer system 500 (FIG. 5)). In some embodiments, the server is a computer device, such as computer system/server 502 (FIG. 5). In some embodiments, process 200 is a subset of method 100 (FIG. 1).

In some embodiments, a server is configured to execute operation 235 of determining a best sentence. In some embodiments, operation 235 may correspond to operation 135 (FIG. 1). In some embodiments, determining a best sentence may include calculating a minimum edit distance 240, comparing token sequences 250, and determining sentence context using surrounding sentences 260.

An edit distance may be a number of operations (i.e., transformation steps) necessary to transform the first sentence into the relevant complete sentence. The transformation steps may include addition (or insertion), deletion, and substitution. A minimum edit distance may determine which of the one or more relevant complete sentences requires the least amount of operations for the first sentence to transform into the relevant complete sentence. In some embodiments, the minimum edit distance is between the first sentence and each of the one or more relevant complete sentences. The minimum edit distance may be one factor in determining how similar the first sentence is to each of the relevant complete sentences.

In some embodiments, calculating a minimum edit distance includes identifying each token of the first sentence 242, identifying each token of the one or more relevant complete sentences 244, comparing each token of the first sentence to each token of the one or more relevant complete sentences 246, and determining a minimum number of transformation steps necessary to execute, in order for the first sentence to transform into each of the one or more relevant complete sentences 248. In some embodiments, comparing the tokens of the first sentence to each of the one or more relevant complete sentences includes determining the similarities and differences between the tokens of the first sentence and the tokens of the relevant complete sentence, for each relevant complete sentence. Determining a minimum number of transformation steps necessary may include determining tokens that are necessary to change in the first sentence to transform into the relevant complete sentence. In some embodiments, determining the minimum number of transformation steps includes determining how many changes have to be made to the first sentence in order for the first sentence to be the same as the relevant complete sentence.

In some embodiments, as discussed herein, determining a best sentence (operation 235) includes comparing token sequences (operation 250). A sequence of tokens may be the specific order of tokens that form to make the sentence. More specifically, a first sequence of tokens for the first sentence may be compared to a second sequence of tokens of the relevant complete sentence, for each of the relevant complete sentences. Therefore, comparing the sequences of tokens may be comparing the orders of the tokens for the sentences.

In some embodiments, comparing the sequence of tokens of the first sentence to the sequence of tokens for each of the one or more relevant complete sentences (operation 250) includes identifying a first sequence of tokens by combining each assigned token of the first sentence 252, identifying a second sequence of tokens for each of the one or more relevant complete sentences 254, and determining one or more differences between the first sequence of tokens and the second sequence of tokens 256. In some embodiments, identifying the first sequence of tokens and the second sequence of tokens includes determining the specific order of tokens for the corresponding sentence (i.e., the first sentence or one of the relevant complete sentences).

In some embodiments, determining the differences between the first sequence of tokens and the second sequence of tokens includes determining any differences between the order of the sequences. In some embodiments, determining the differences includes determining a nearness percentage between corresponding tokens of the first sentence and each relevant complete sentence. The nearness percentage may be how close in sequence a specific token is in the first sentence compared to a similar, or corresponding, token in the relevant complete sentence. In some embodiments, the nearness percentage uses the part-of-speech corresponding to each token. For example, a token "friend" from the first sentence has a noun part-of-speech, and a token "Barb" from a relevant complete sentence also has a noun part-of-speech. Because these tokens have the same part-of-speech, the tokens may be determined to be corresponding tokens and may be compared to find a nearness percentage (e.g., how close in sequence each token is).

In some embodiments, as discussed herein, determining a best sentence (operation 235) includes determining sentence context using surrounding sentences (operation 260). Surrounding sentences may be used to gain context for the first sentence. In some embodiments, surrounding sentences may be sentences that were created the closest, temporally, to the first sentence. The surrounding sentences may be the sentences with a time and date of creation most closely related to a time and date of creation for the first sentence. For example, the sentence created (i.e., time and date) right before the first sentence and the sentence created right after the first sentence may be the surrounding sentences. In another example, the three sentences created right before the first sentence are the surrounding sentences. The surrounding sentences may be used to help determine a context for the first sentence. For example, a first sentence may be "while going he met his old friend" and the sentence that precedes the first sentence on the database may be "He went to the mall yesterday." The preceding sentence may give context, specifically a location and a time, to the first sentence. The preceding sentence discusses a "mall" as a location and "yesterday" as a time.

In some embodiments, determining a best sentence 235 includes weighting the minimum edit distance, the comparison of the first sequence of tokens to the second sequence of tokens, and the context of the first sentence, and determining the best sentence based on the weighting. All three factors may be used to help determine the best sentence. Depending on the sentences, different factors may be more significant, or beneficial, in determining the best sentence. In some embodiments, the weighting includes determining which factor is the most significant (i.e., is most likely to induce a best sentence)—between the minimum edit distance, the comparison of the first sequence of tokens to the second sequence of tokens, and the context of the first sentence—using semantic and syntactic analysis, and giving the most weight to the most significant factor. In some embodiments, the minimum edit distance, the comparison of the first sequence of tokens to the second sequence of tokens, and the context of the first sentence are correlated to determine the best sentence.

Referring to FIG. 3, a schematic diagram of a sample parse tree 300 is depicted, according to some embodiments. Parse tree 300 includes a sentence 305, "while going he met his old friend." Sentence 305 may be broken down into components "While" 310, "Going" 320, "He" 330, "Met" 340, "His" 350, "Old" 360, "Friend" 370. In some embodiments, each component of sentence 305 is a token. In some embodiments, parse tree 300 includes parts-of-speech 315, 325, 335, 345, 355, 365, and 375 that correspond to each token 310, 320, 330, 340, 350, 360, and 370. In parse tree 300, token 310 is a conjunction (IN) 315, token 320 is a present participle verb (VBG) 325, token 330 is a personal pronoun (PRP) 335, token 340 is a past-tense verb (VBD) 345, token 350 is a possessive pronoun (PRP$) 355, token 360 is an adjective (JJ) 365, and token 370 is a singular noun (NN) 375.

In some embodiments, parse tree 300 includes grammatical relations 380, 382, 384, 386, 388, 390 between various tokens 310, 320, 330, 340, 350, 360, and 370. In some embodiments, the grammatical relations may be used in the compare token sequences 250 operation of FIG. 2. The grammatical relations may be determined using the parts-of-speech 315, 325, 335, 345, 355, 365, and 375 corresponding to each token 310, 320, 330, 340, 350, 360, and 370, in some embodiments. In parse tree 300, the grammatical relation 380 between token 340 and token 310 (and parts-of-speech 345 and 315) is a marker. The grammatical relation 382 between token 340 and token 370 (and parts-of-speech 345 and 375) is a direct object. the grammatical relation 384 between token 340 and token 320 (and parts-of-speech 345 and 325) is a clausal subject. The grammatical relation 386 between token 370 and token 350 (and parts-of-speech 375 and 355) is a possessive nominal modifier. The grammatical relation 388 between token 320 and token 330 (and parts-of-speech 325 and 335) is a direct object. The grammatical relation 390 between token 370 and token 360 (and parts-of-speech 375 and 365) is an adjectival modifier. The parse tree may be used to break down the sentence and analyze it using natural language processing and neural parsing.

Figure 4:
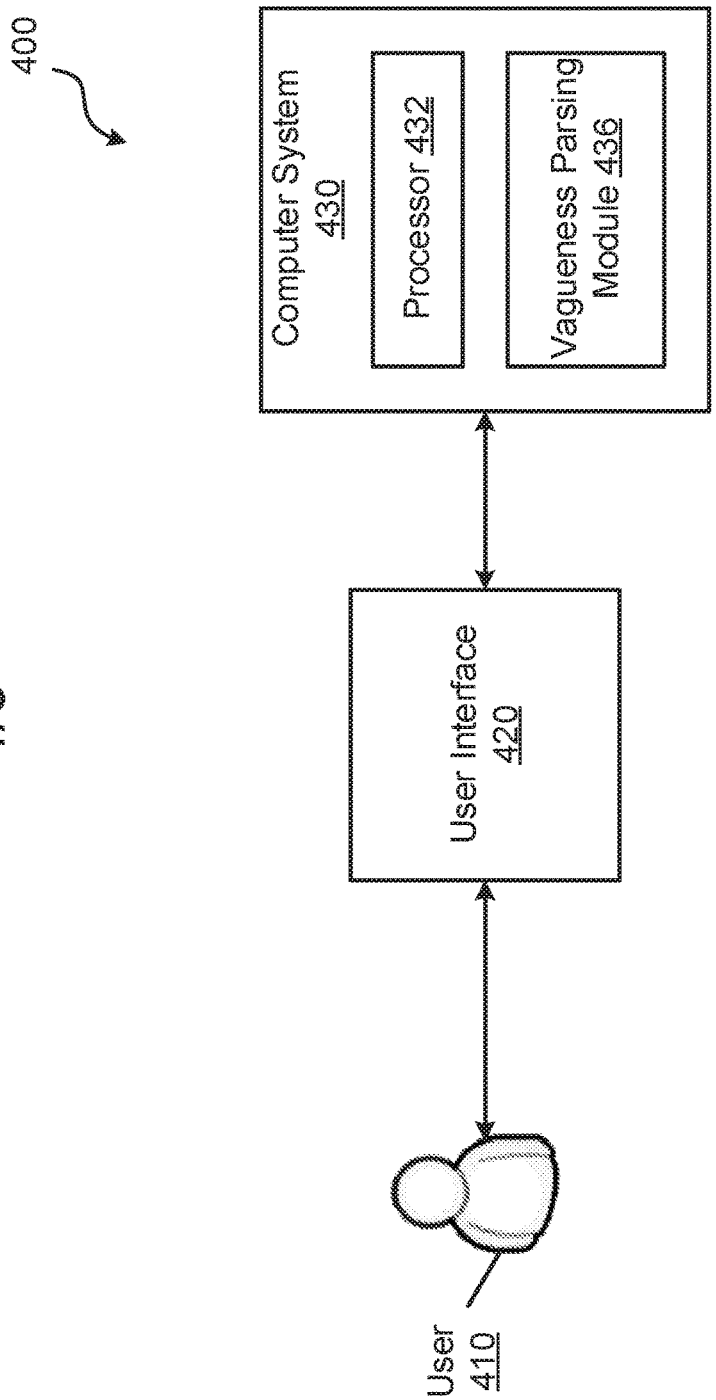
FIG. 4 depicts a block diagram of components of a system for identifying intra sentence vague components, according to some embodiments.
Figure 5:
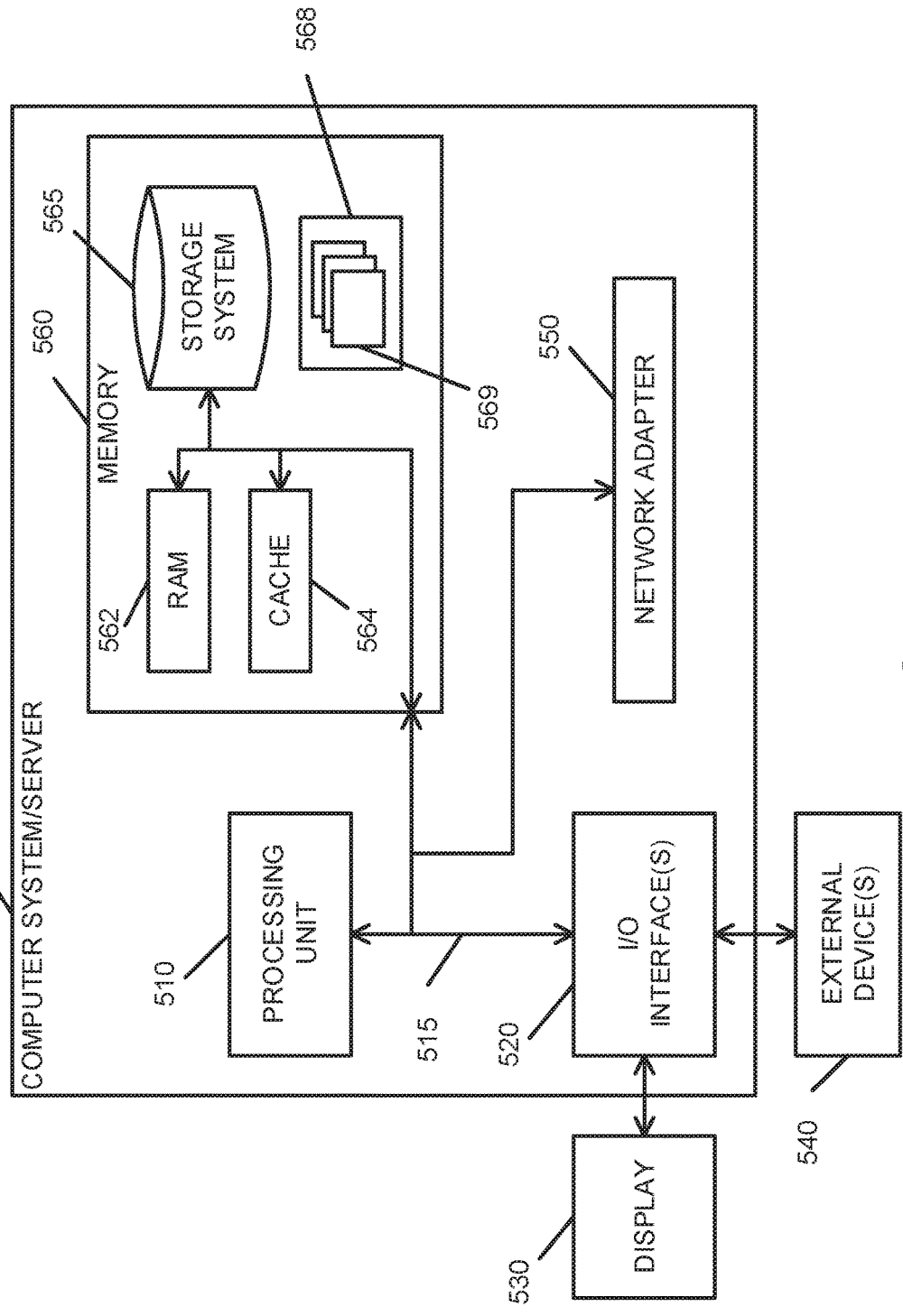
FIG. 5 depicts a block diagram of a sample computer system, according to some embodiments.

Referring to FIG. 4, a block diagram of components of a system 400 for identifying intra sentence vague components is depicted, according to some embodiments. In some embodiments, system 400 includes a user 410, a user interface 420, and a computer system 430. In some embodiments, user interface 420 is communicatively coupled to computer system 430. In some embodiments, user interface 420 is within, or a part of, computer system 430. In some embodiments, computer system 430 performs the operations of method 100 (FIG. 1). In an exemplary embodiment, user 410 may submit a natural language sentence to user interface 420. User interface 420 may send this sentence to computer system 430 for processing. In some embodiments, computer system 430 includes a processor 432 and a vagueness parsing module 436. In some embodiments, the vagueness parsing module 436 is software installed on computer system 430 to execute method 100 (FIG. 1). System 400 is just one example of a system for identifying intra sentence vague components. Other systems consistent with the embodiments of this disclosure are also contemplated.

Referring to FIG. 5, computer system 500 is a computer system/server 502 is shown in the form of a general-purpose computing device, according to some embodiments. The components of computer system/server 502 may include, but are not limited to, one or more processors or processing units 510, a system memory 560, and a bus 515 that couple various system components including system memory 560 to processor 510.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 560 can include computer system readable media in the form of volatile memory, such as random-access memory (RAM) 562 and/or cache memory 564. Computer system/server 502 may further include other removable/non-removable, volatile/non-volatile computer system storage media. By way of example only, storage system 565 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 560 may include at least one program product having a set (e.g., at least one) of program modules that are configured to carry out the functions of embodiments of the invention.

Program/utility 568, having a set (at least one) of program modules 569, may be stored in memory 560 by way of example, and not limitation, as well as an operating system, one or more application programs, other program modules, and program data. Each of the operating system, one or more application programs, other program modules, and program data or some combination thereof, may include an implementation of a networking environment. Program modules 569 generally carry out the functions and/or methodologies of embodiments of the invention as described herein.

Computer system/server 502 may also communicate with one or more external devices 540 such as a keyboard, a pointing device, a display 530, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 550. As depicted, network adapter 550 communicates with the other components of computer system/server 502 via bus 515. It should be understood that although not shown, other hardware and/or software components could be used in conjunction with computer system/server 502. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a first sentence;
   assigning tokens to each component of the first sentence;
   comparing a total number of tokens of the first sentence to a threshold number of tokens;
   in response to determining that the total number of tokens is less than the threshold number of tokens, identifying one or more relevant complete sentences from a database;
   determining a best sentence from the one or more relevant complete sentences; and
   determining a vague component of the first sentence by comparing the best sentence to the first sentence.

2. The method of claim 1, wherein determining the best sentence from the one or more relevant complete sentences comprises:

calculating a minimum edit distance between the first sentence and each of the one or more relevant complete sentences;

comparing a first sequence of tokens of the first sentence to each sequence of tokens for each of the one or more relevant complete sentences; and determining a context of the first sentence using a previous sentence and a next sentence.

3. The method of claim 2, wherein calculating the minimum edit distance comprises:

identifying each token of the first sentence;

identifying each token of the one or more relevant complete sentences;

comparing each token of the first sentence to each token of the one or more relevant complete sentences; and determining a minimum number of transformation steps necessary to transform the first sentence into a relevant complete sentence, for each of the one or more relevant complete sentences.

4. The method of claim 2, wherein comparing the first sequence of tokens of the first sentence to the each sequence of tokens for the each of the one or more relevant complete sentences comprises:

identifying the first sequence of tokens for the first sentence by combining each assigned token of the first sentence;

identifying a sequence of tokens for each of the one or more relevant complete sentences; and determining one or more differences between the first sequence of tokens and the sequence of tokens for each of the one or more relevant complete sentences.

5. The method of claim 2, wherein determining the context of the first sentence includes determining one or more relevant complete sentences with a time and date of creation most similar to a first time and data of creation for the first sentence.

6. The method of claim 2, further comprising:

weighting the minimum edit distance, the comparison of the first sequence of tokens to the second sequence of tokens, and the context of the first sentence.

7. The method of claim 1, wherein comparing the best sentence to the first sentence comprises:

comparing each token of the first sentence to each token of the best sentence; and determining that one or more tokens of the first sentence are different than one or more tokens of the best sentence.

8. The method of claim 1, further comprising:

in response to the assigning the tokens to each component of the first sentence, calculating the threshold number of tokens for the database.

9. The method of claim 8, wherein calculating the threshold number of tokens for the database comprises:

determining a number of tokens for each complete sentence in the database;

removing complete sentences with an outlier number of tokens as the determined number of tokens from the calculation; and determining a minimum number of tokens used to form the complete sentence from the determined number of tokens for remaining complete sentences.

10. The method of claim 1, further comprising:

generating an output identifying the vague component of the first sentence.

11. The method of claim 10, wherein the output includes an instruction for adding a component to the first sentence, based on the vague component.

12. A system having one or more computer processors, the system configured to:

receive a first sentence;

assign tokens to each component of the first sentence;

compare a total number of tokens of the first sentence to a threshold number of tokens;

in response to determining that the total number of tokens is less than the threshold number of tokens, identify one or more relevant complete sentences from a database;

determine a best sentence from the one or more relevant complete sentences; and determine a vague component of the first sentence by comparing the best sentence to the first sentence.

13. The system of claim 12, wherein determining the best sentence from the one or more relevant complete sentences comprises:

calculating a minimum edit distance between the first sentence and each of the one or more relevant complete sentences;

comparing a first sequence of tokens of the first sentence to each sequence of tokens for each of the one or more relevant complete sentences; and determining a context of the first sentence using a previous sentence and a next sentence.

14. The system of claim 13, wherein calculating the minimum edit distance comprises:

identifying each token of the first sentence;

identifying each token of the one or more relevant complete sentences;

comparing the each token of the first sentence to the each token of the one or more relevant complete sentences; and determining a minimum number of transformation steps necessary to transform the first sentence into a relevant complete sentence, for each of the one or more relevant complete sentences.

15. The system of claim 13, wherein comparing the first sequence of tokens of the first sentence to the each sequence of tokens for the each of the one or more relevant complete sentences comprises:

identifying the first sequence of tokens for the first sentence by combining each assigned token of the first sentence;

identifying a sequence of tokens for each of the one or more relevant complete sentences; and determining one or more differences between the first sequence of tokens and the sequence of tokens for each of the one or more relevant complete sentences.

16. The system of claim 12, wherein comparing the best sentence to the first sentence comprises:

comparing each token of the first sentence to each token of the best sentence; and determining that one or more tokens of the first sentence are different than one or more tokens of the best sentence.

17. A computer program product comprising a computer readable storage medium having program instructions embodied therewith, the program instructions executable by a server to cause the server to perform a method, the method comprising:

receiving a first sentence;

assigning tokens to each component of the first sentence;

comparing a total number of tokens of the first sentence to a threshold number of tokens;

in response to determining that the total number of tokens is less than the threshold number of tokens, identifying one or more relevant complete sentences from a database;

determining a best sentence from the one or more relevant complete sentences; and determining a vague component of the first sentence by comparing the best sentence to the first sentence.

18. The computer program product of claim 17, wherein determining the best sentence from the one or more relevant complete sentences comprises:

calculating a minimum edit distance between the first sentence and each of the one or more relevant complete sentences;

comparing a first sequence of tokens of the first sentence to each sequence of tokens for each of the one or more relevant complete sentences; and determining a context of the first sentence using a previous sentence and a next sentence.

19. The computer program product of claim 18, wherein calculating the minimum edit distance comprises:

identifying each token of the first sentence;

identifying each token of the one or more relevant complete sentences;

comparing each token of the first sentence to each token of the one or more relevant complete sentences; and determining a minimum number of transformation steps necessary to transform the first sentence into a relevant complete sentence, for each of the one or more relevant complete sentences.

20. The computer program product of claim 18, wherein comparing the first sequence of tokens of the first sentence to the each sequence of tokens for the each of the one or more relevant complete sentences comprises:

identifying the first sequence of tokens for the first sentence by combining each assigned token of the first sentence;

identifying a sequence of tokens for each of the one or more relevant complete sentences; and determining one or more differences between the first sequence of tokens and the sequence of tokens for each of the one or more relevant complete sentences.

\* \* \* \* \*